United States Patent
Takahashi

(10) Patent No.: US 10,470,447 B2
(45) Date of Patent: Nov. 12, 2019

(54) ROTATABLE LINE TIE ARM FOR A SLOTTED LIP ON A FISHING LURE

(71) Applicant: Normark Innovations, Inc., Minnetonka, MN (US)

(72) Inventor: Hiroshi Takahashi, Sheung Shui (HK)

(73) Assignee: Normark Innovations, Inc., Minnetonka, MN (US)

( * ) Notice: Subject to any disclaimer, the term of this patent is extended or adjusted under 35 U.S.C. 154(b) by 966 days.

(21) Appl. No.: 13/895,812

(22) Filed: May 16, 2013

(65) Prior Publication Data

US 2013/0305587 A1 Nov. 21, 2013

Related U.S. Application Data

(60) Provisional application No. 61/648,773, filed on May 18, 2012.

(51) Int. Cl.
*A01K 85/16* (2006.01)
*A01K 85/18* (2006.01)

(52) U.S. Cl.
CPC .............. *A01K 85/16* (2013.01); *A01K 85/18* (2013.01)

(58) Field of Classification Search
CPC ........ A01K 85/00; A01K 83/00; A01K 85/16; A01K 85/18
USPC .... 43/42, 42.08, 42.49, 42.37, 42.02, 42.04, 43/42.22, 42.23, 43.1, 43.14, 44.92, 44.95
See application file for complete search history.

(56) References Cited

U.S. PATENT DOCUMENTS

| | | | |
|---|---|---|---|
| 1,266,311 A | 5/1918 | Phinney | |
| 1,333,154 A | 3/1920 | Buddle | |
| 1,997,900 A | 4/1935 | Edwards | |
| 2,608,016 A | 8/1952 | Shipley | |
| 2,618,096 A | 11/1952 | Wagner | |
| 2,755,592 A * | 7/1956 | Bocchino | 43/42.22 |
| 3,279,117 A | 10/1966 | Weimer | |
| 3,367,057 A | 2/1968 | Pond | |
| 3,643,370 A * | 2/1972 | Cook | A01K 95/00 43/43.12 |
| 3,815,275 A | 6/1974 | Amundson | |
| 4,402,155 A * | 9/1983 | Mumma | A01K 85/16 43/42.08 |
| D271,415 S * | 11/1983 | Mumma | D22/133 |
| 4,791,751 A * | 12/1988 | Francklyn | A01K 83/06 43/42.47 |
| 6,101,758 A * | 8/2000 | Finley | A01K 85/16 43/42.22 |
| 6,516,552 B2 * | 2/2003 | Hawkins | A01K 85/00 43/42.09 |
| 7,316,095 B1 * | 1/2008 | Petner | A01K 85/16 43/42.22 |
| 2006/0254119 A1 | 11/2006 | Siirtola et al. | |
| 2008/0083153 A1 * | 4/2008 | Ford | A01K 91/08 43/43.13 |

(Continued)

*Primary Examiner* — Lisa L Tsang
(74) *Attorney, Agent, or Firm* — Dority & Manning, P.A.

(57) ABSTRACT

A fishing lure including a lure body comprising a pin; a lip extending from the lure body, wherein the lip defines a slot therein; and a line tie arm comprising a line tie loop and a pivot ring connected to opposite ends of a beam, with the pivot ring being rotatably attached to the pin. The line tie arm is positioned such that the line tie loop extends through the slot defined in the lip when in a fishing position.

13 Claims, 10 Drawing Sheets

(56) References Cited

U.S. PATENT DOCUMENTS

2008/0155884 A1\* 7/2008 Sisson .................. A01K 85/16
  43/42.47
2010/0000145 A1   1/2010 Leppala
2011/0258906 A1\* 10/2011 Ford .................... A01K 85/16
  43/42.23

\* cited by examiner

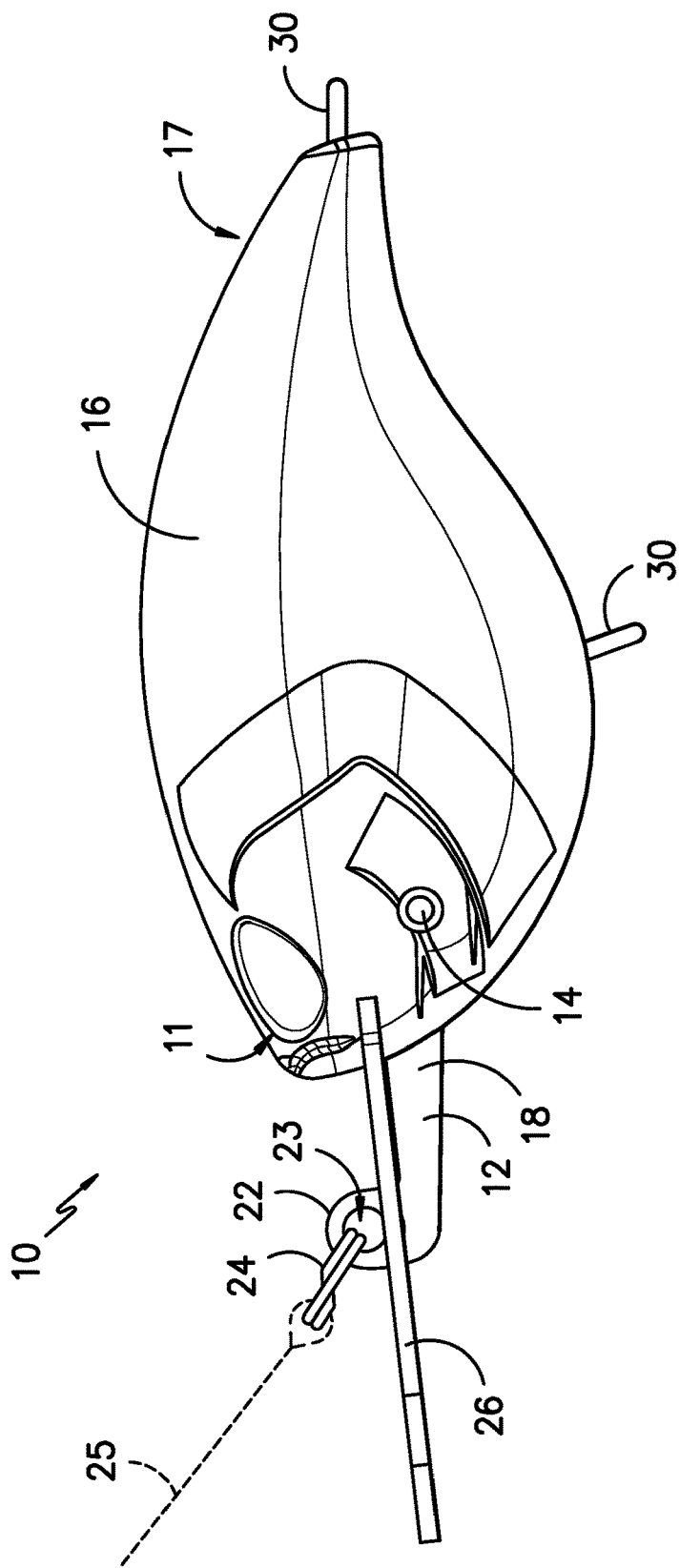
FIG. -1-

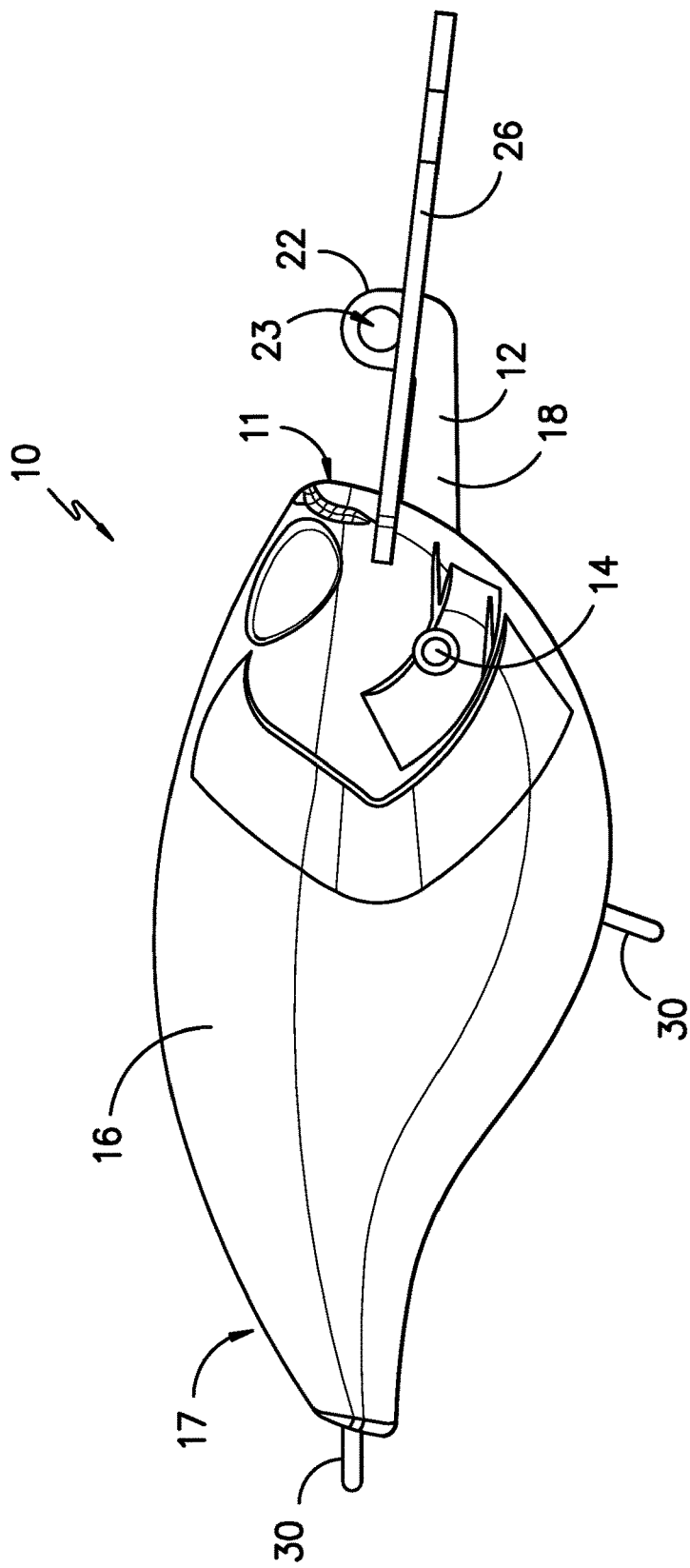
FIG. -2-

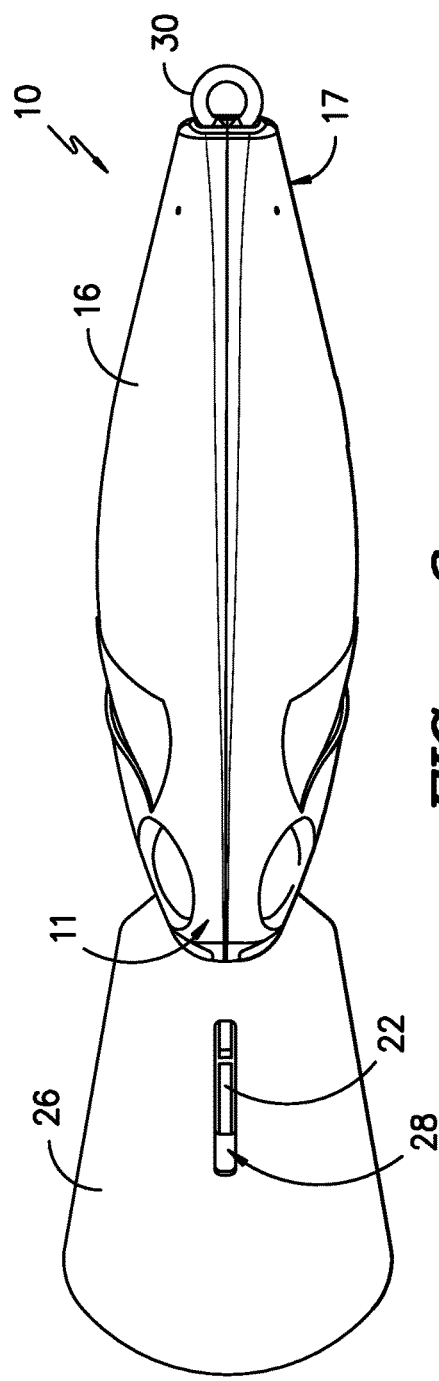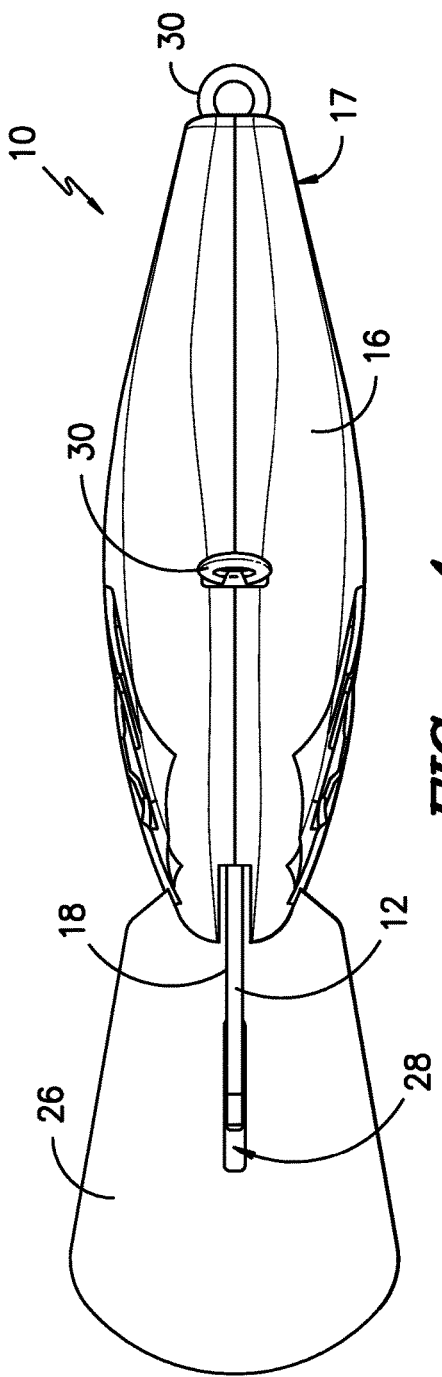

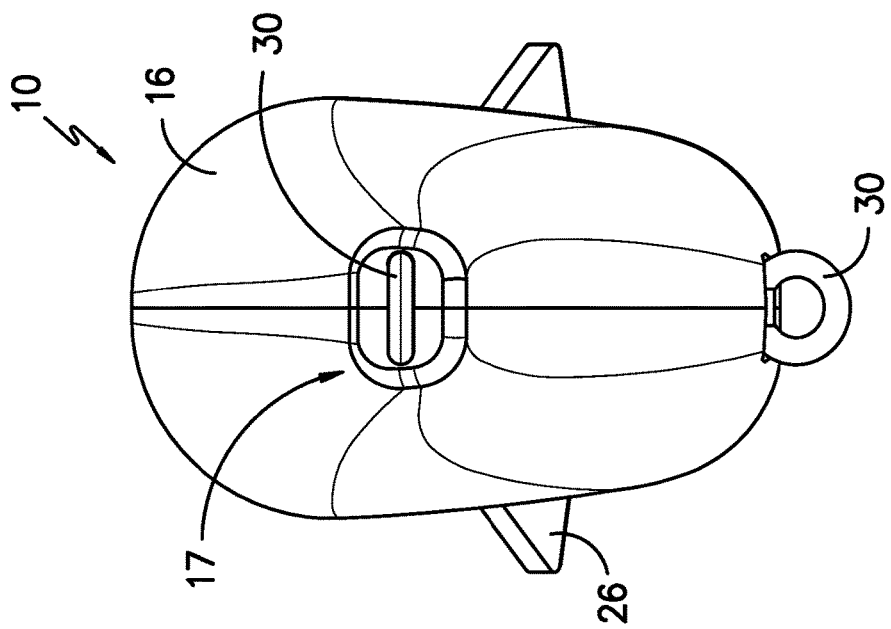
FIG. -6-
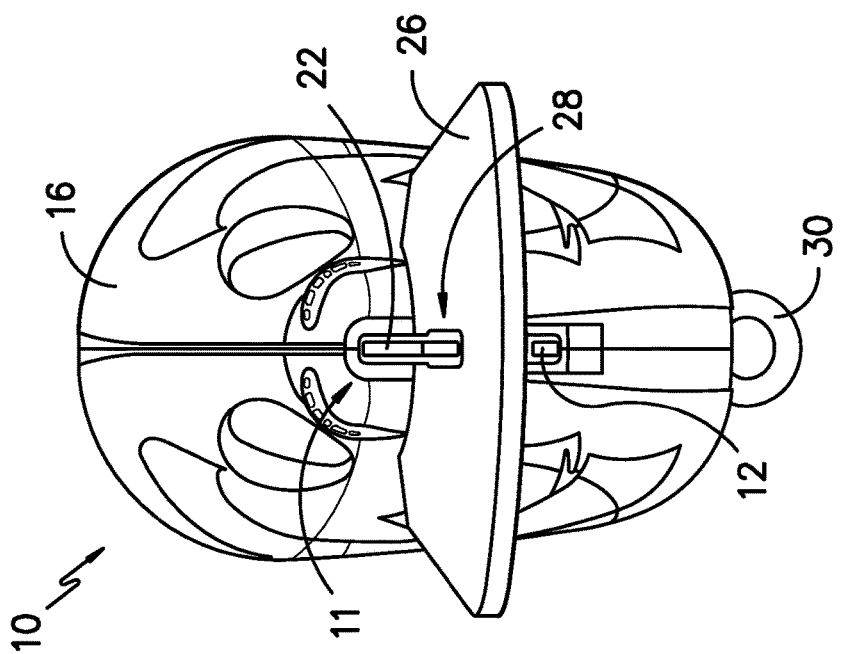
FIG. -5-

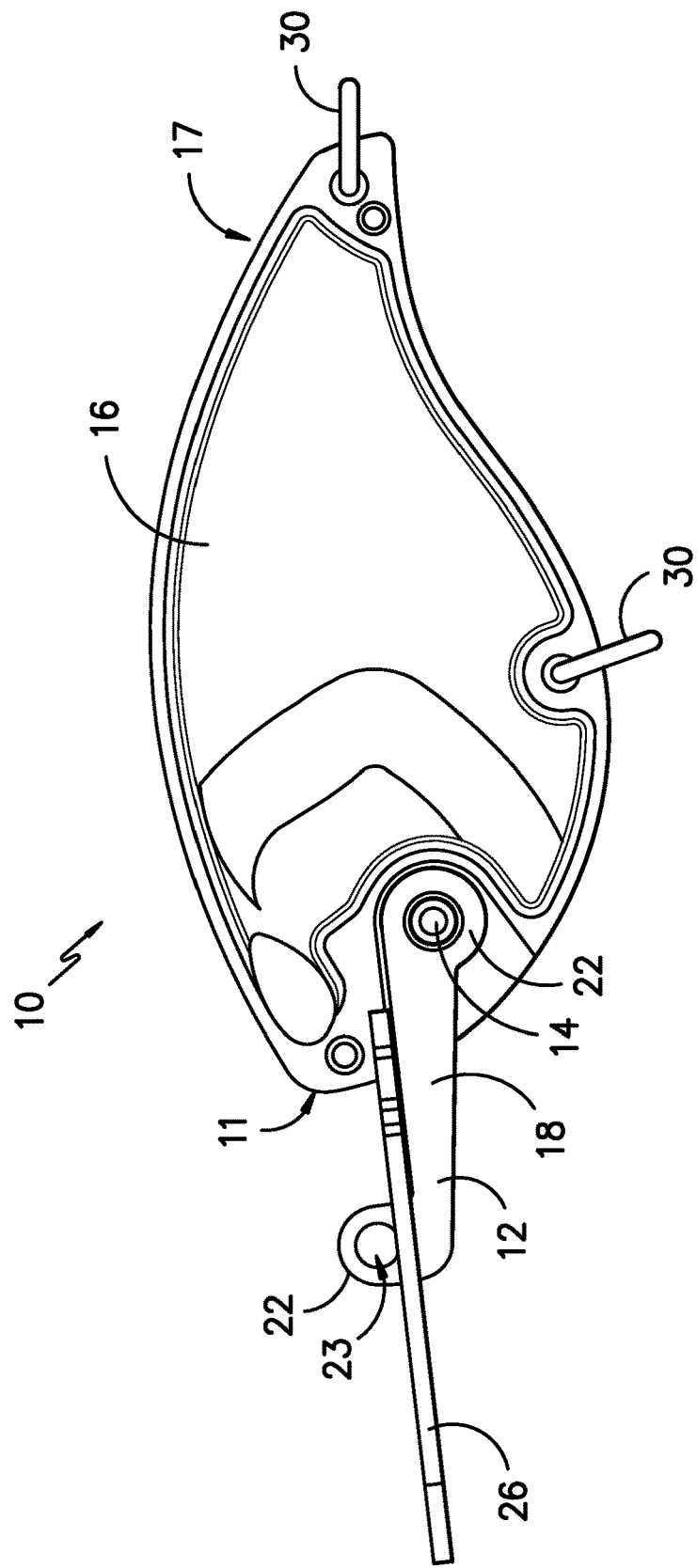
FIG. -7-

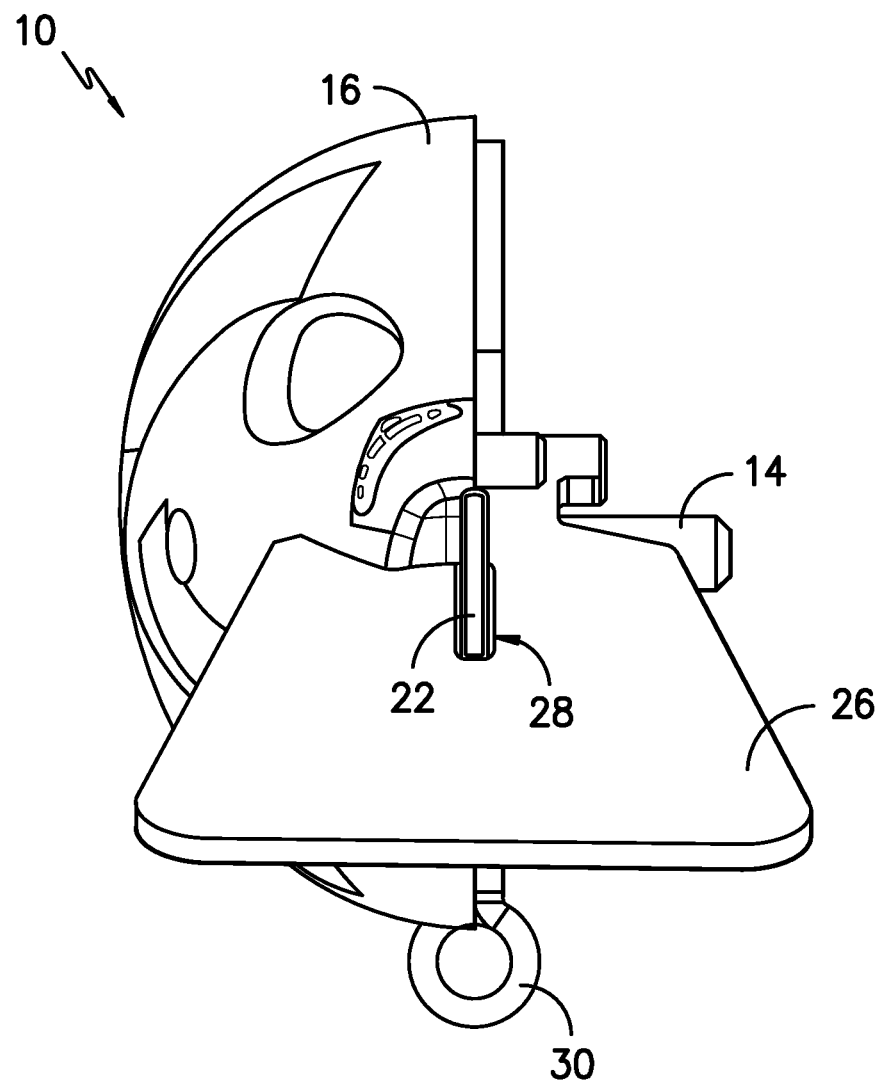
FIG. -8-

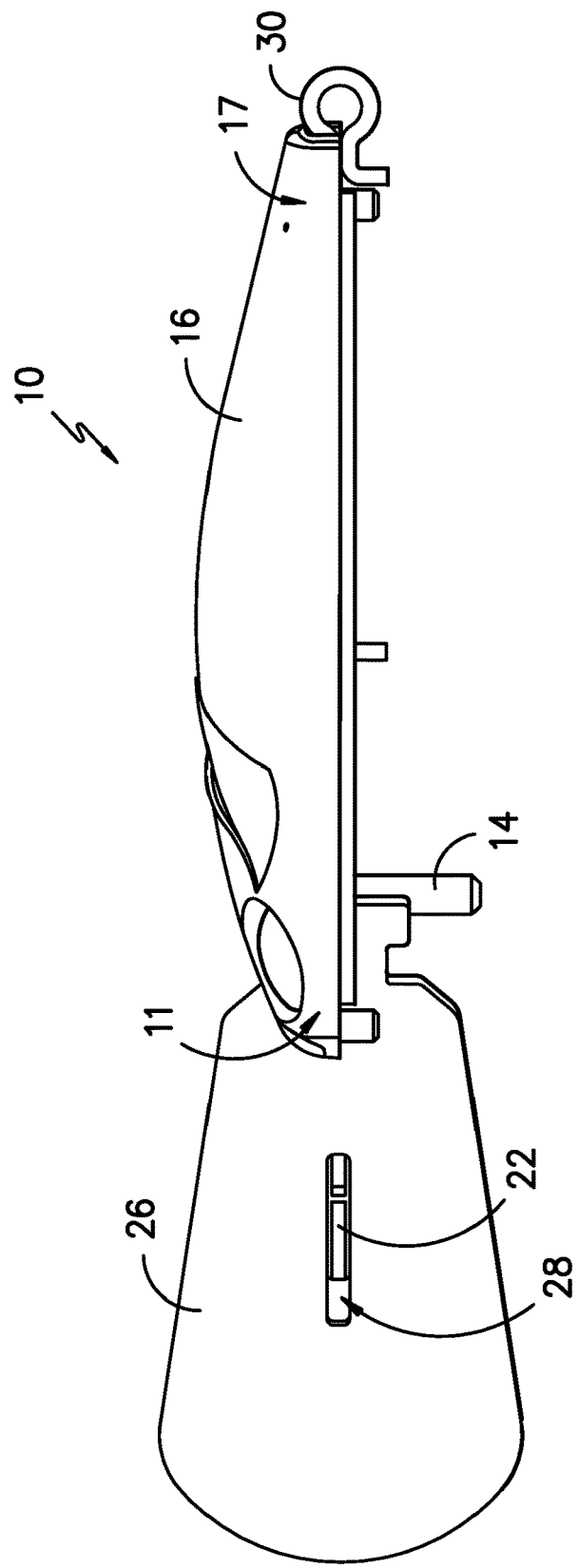
FIG. -9-

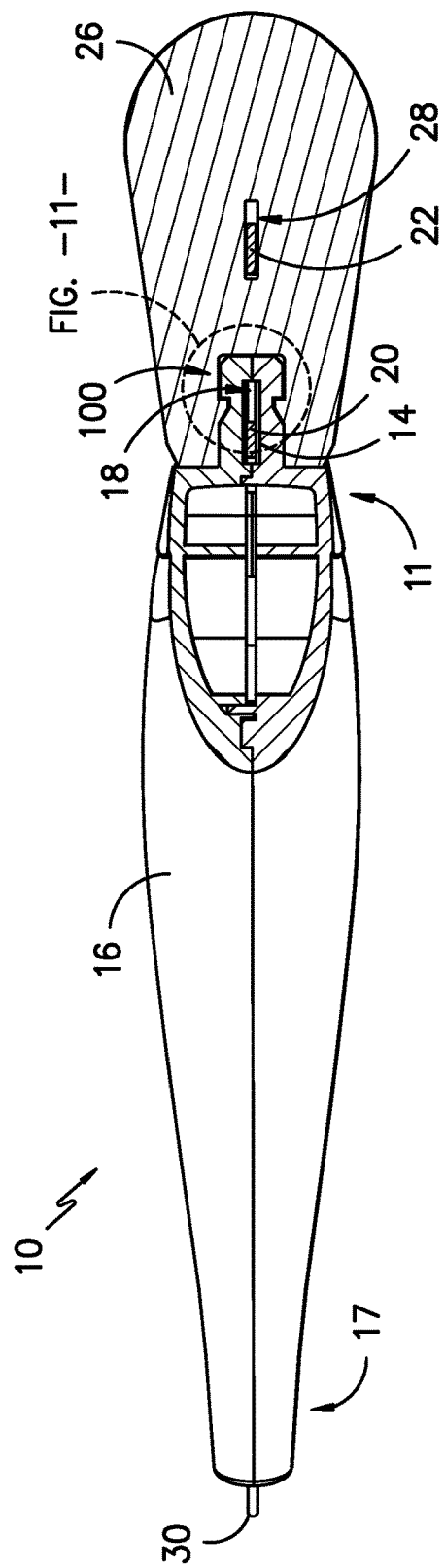
FIG. -10-

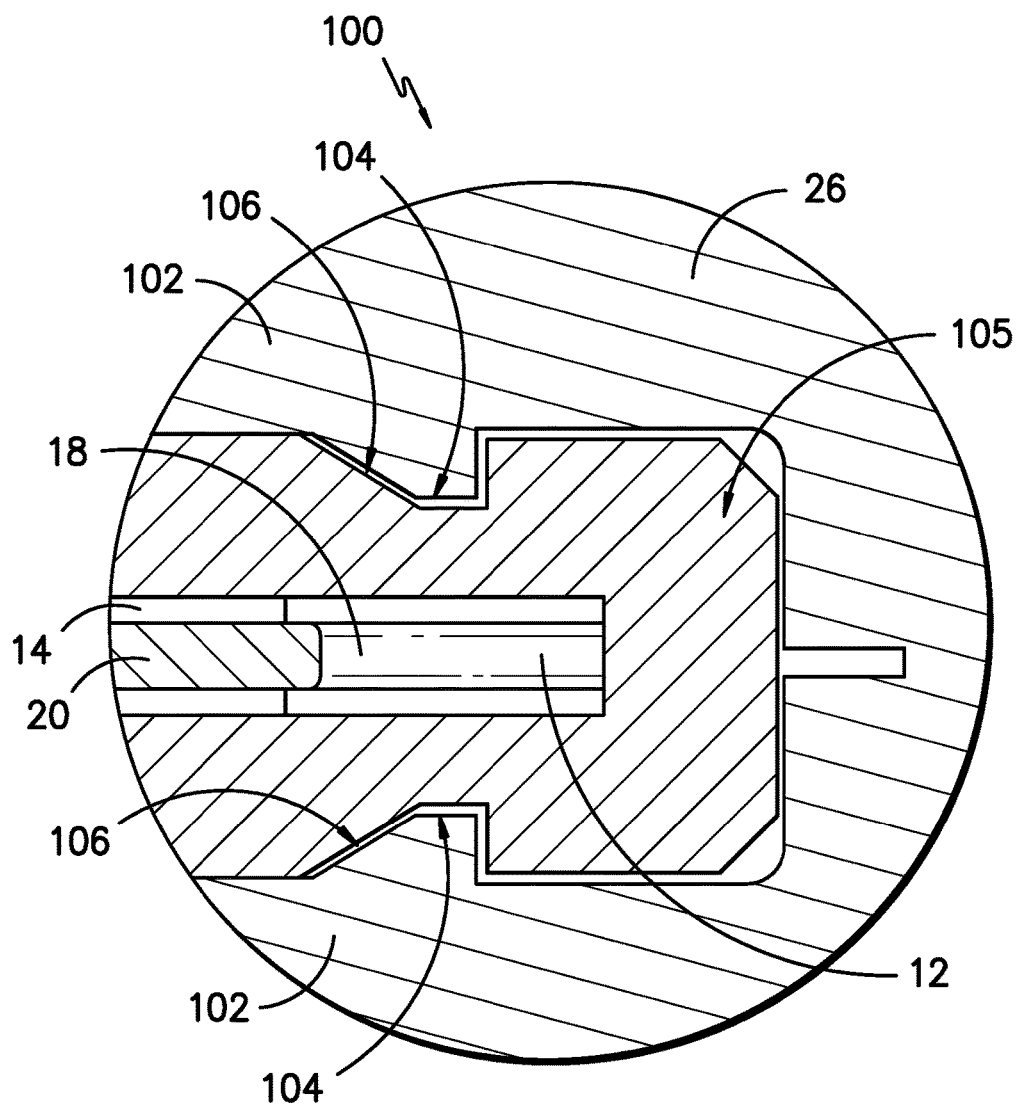
FIG. −11−

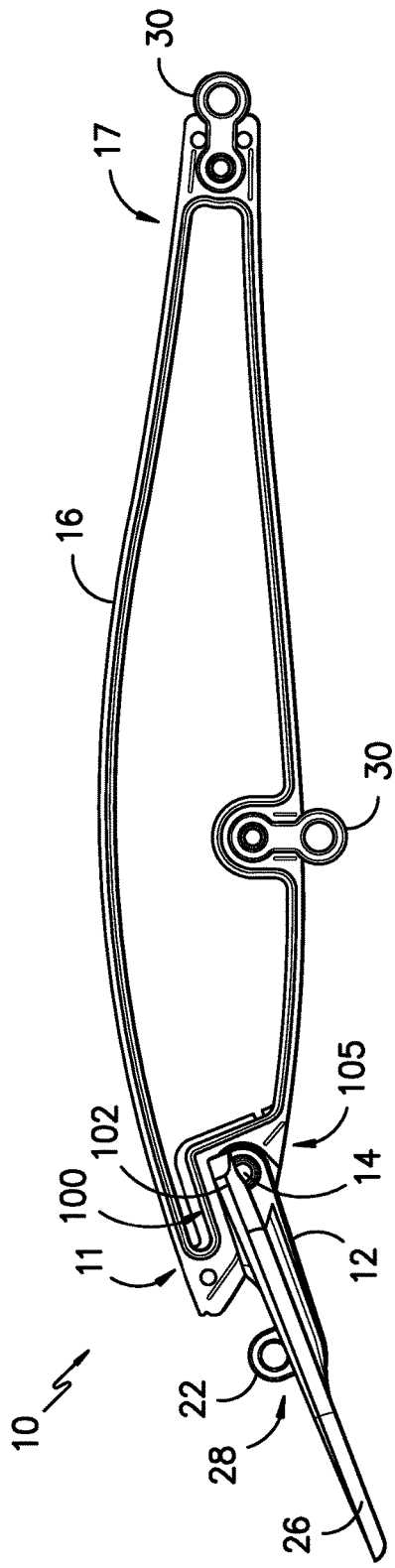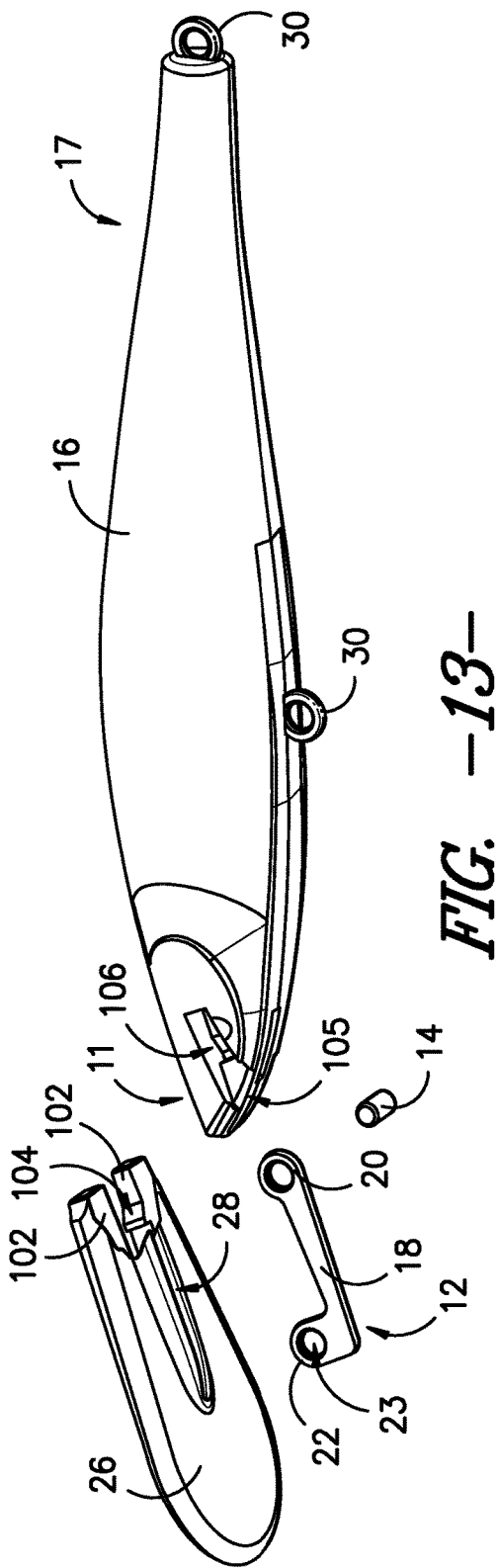

ROTATABLE LINE TIE ARM FOR A SLOTTED LIP ON A FISHING LURE

PRIORITY INFORMATION

Priority is claimed to U.S. Provisional Patent Application Ser. No. 61/648,773 titled "Rotatable Line Tie Arm for a Slotted Lip on a Fishing Lure" of Hiroshi Takahashi filed on May 18, 2012, the disclosure of which is incorporated by reference herein.

BACKGROUND

Sport fishing is enjoyed around the world. From fresh water to salt water, a wide variety of fish species exist. Fishermen employ a variety of equipment and tackle depending upon the water being fished, the time of day, the species of fish sought, personal choice, and many other factors. A fishing lure, sometimes referred to as an artificial lure, is frequently a part of such equipment and tackle.

Fishing lures are typically designed and decorated with the goal of replicating or mimicking the movement and appearance of a food source for the particular fish being sought. For example, such lure may take on the shape of a minnow, tadpole, frog, mouse, insect, salamander, another fish, or such other food source. The fisherman's hope is that by having a lure closely resembling or acting like a source of food, fish will be enticed into biting the lure.

In an effort to make the lure aesthetically realistic, a designer can use materials pigmented with the desired colors. For example, colored plastics or rubber may be used. In addition, a designer can paint or stain the external surface of the lure to achieve the desired color and marking characteristics. Decorative features such as scales, eyes, and fins may be painted onto the surface or otherwise added to the lure.

Lures can also be designed with features that make the lure realistic in a functional manner. Fins, diving planes, spinners, rattles and the like may be added in order to make the lure move and sound like a food source. Some lures may be specifically designed to operate on the water surface while others may function only when below. Generally speaking, the lure's overall shape, the weight of the lure, the design of any lip on the lure, and the location of the point of attachment to the fishing line can affect the swim path of the lure during retrieval.

Typically, deep diving lures have diving planes made out of either a plastic material or a metal material. However, both types of materials present certain disadvantages in their respective use. For example, a diving plane made from a plastic material relies almost exclusively on the performance of the diving plane to bring the lure to deeper depths. Also, a plastic diving plane can be easily damaged, especially along the leading edge, which can and does affect the performance of the diving plane. Alternatively, a metal diving plane can rely on both the weight of the diving plane and the performance of the diving plane to bring the lure to deeper depths. However, metal diving planes also present several disadvantages because an all metal diving plane is easily bendable, which can and does adversely affect the performance of the lure.

For example, crankbaits (a particular type of diving lure) have a problem with running straight using typical production methods, that arises mainly because it is difficult to accurately position the line tie on the lure lip during the ultrasonic welding process that joins the two lure body or lip halves together. In addition, during normal use, the lure may lose its "tune" due to bending of or damage to the lure's lip while fighting a fish or pulling the lure through heavy cover. Re-tuning the lure requires careful bending of the lip to restore the original action. The act of tuning a lure requires significant skill and time to do it properly.

Additionally, since the line tie is typically attached to the lure lip in a crankbait, the lure lip materials and thicknesses must allow for the line tie dimensions and provide enough strength so that the lip doesn't break during retrieve through cover or while fighting fish. With the increasing use of high strength, low stretch braided lines this problem is made more difficult because greater impact forces can be transmitted to the lip of the lure during casting and during retrieve through heavy cover. Increasing the lip thickness to combat these issues is not an ideal solution, because it adds extra weight to the front of the lure which adversely affects the lure action.

As such, a need exists for a diving lure that has sufficient strength to withstand typical use (including fighting fish using high strength, low stretch braided lines) while avoiding affecting the tuning of the lip attached to the lure.

SUMMARY

Objects and advantages of the invention will be set forth in part in the following description, or may be obvious from the description, or may be learned through practice of the invention.

Fishing lures are generally provided that, in one embodiment, include: a lure body comprising a pin; a lip extending from the lure body, wherein the lip defines a slot therein; and a line tie arm comprising a line tie loop and a pivot ring connected to opposite ends of a beam, with the pivot ring being rotatably attached to the pin. The line tie arm is positioned such that the line tie loop extends through the slot defined in the lip when in a fishing position.

In one particular embodiment, the lure further includes a ring (e.g., a split ring) attached to the line tie loop and configured to hold the line tie arm in the fishing position.

The line tie loop and the slot can both be, in one particular embodiment, oriented in a longitudinal direction defined by the lure body. Alternatively, the line tie loop and the slot can both be oriented in a lateral direction defined by the lure body.

The components of the lure can be constructed from a variety of suitable materials. For example, the line tie arm and/or the pin is, in one embodiment, constructed from stainless steel. In one embodiment, the lure body can be made of a molded plastic material. The lip, in certain embodiments, can be constructed from a molded plastic material, a metal material or alloy, fiberglass, or a carbon composite.

In one particular embodiment, the lip is attached to the lure body via a snap connection.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures, in which:

FIG. 1 is a side view of an exemplary fishing lure according to one embodiment of the present invention;

FIG. 2 is a side view of the opposite side the exemplary fishing lure shown in FIG. 1;

FIG. 3 is a top view of the exemplary fishing lure shown in FIG. 1;

FIG. 4 is a bottom view of the exemplary fishing lure shown in FIG. 1;

FIG. 5 is a front view of the exemplary fishing lure shown in FIG. 1;

FIG. 6 is a rear view of the exemplary fishing lure shown in FIG. 1;

FIG. 7 is a cut-away side view of the exemplary fishing lure shown in FIG. 1;

FIG. 8 is a cut-away front view of the exemplary fishing lure shown in FIG. 1;

FIG. 9 is a cut-away top view of the exemplary fishing lure shown in FIG. 1;

FIG. 10 is a top view of an exemplary fishing lure according to another embodiment of the present invention;

FIG. 11 is a close-up top view of an enlarged section of the exemplary fishing lure shown in FIG. 10;

FIG. 12 is a cut-away side view of the exemplary fishing lure shown in FIG. 10; and FIG. 13 is a perspective bottom view of several components of the exemplary fishing lure shown in FIG. 10.

Repeat use of reference characters in the present specification and drawings is intended to represent the same or analogous features or elements of the present invention.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

A fishing lure having a floating line tie arm is generally provided, along with its methods of manufacture and use. The floating line tie arm provides a mechanism for attaching a fishing line to the lure while avoiding the requirement for additional and/or subsequent tuning of a lure lip. For example, there can be enough lateral movement in the line tie to keep the fishing lure in tune while providing a desirable searching action in the lure. Additionally, since the line tie arm is not attached to the lip, the line tie can be made much thicker and stiffer than a typical line tie and should not bend during typical use.

Due to the use of the line tie arm, the lure lip can be made from much thinner materials than is currently possible with traditional lure construction (i.e., where a line tie attachment ring is attached to and located on the lure lip). Because the line tie arm is attached to the body and merely intersects the plane of the lip, there are no special strength requirements for the lip. Thus, the use of different lip materials that may be thinner and/or more flexible is allowed when compared to traditional lip materials. Such use of different lip materials gives more flexibility to the lure designer to impart different actions to the lure.

Finally, the line tie arm reduces and/or substantially eliminates the possibility of lip breakage during casting with high-strength, low-stretch braided fishing lines and while fighting fish through heavy cover. Thus, the presently provided line tie arm allows for sufficient strength and durability to the lure, and particularly to the lure lip.

Referring to FIG. 1, an exemplary fishing lure 10 is generally provided that includes a line tie arm 12 rotatable around a pin 14 positioned within the lure body 16. As more particularly shown in FIG. 7, the line tie arm 12 generally includes a beam 18 extending from a pivot ring 20 configured to be rotatable around the pin 14. The line tie arm 12 also includes a line tie loop 22 attached to the beam 18 at the end opposite to the pivot ring 20. The line tie loop 22 of the line tie arm 12 generally extends through a slot 28 within the lip 26 to allow attachment of a fishing line 25 thereto. Generally, the line tie loop 22 defines an aperture 23 configured to attach to a fishing line 25. The fishing line 25 can be attached directly to the line tie loop 22, or to an optional ring 24 (when present). Although shown as a split ring, the optional ring 24 can be any other suitable design, such as a welded metal ring. As is known in the art, the fishing line 25 can be connected to the line tie loop 22 or the split ring 24 (when present) by any connection mechanism (e.g., a knot, a crimp attachment, etc.).

The lip 26 generally extends from the head portion 11 of the lure body 16 and acts as a diving plane for the lure 10. Thus, the lip 26 can be designed and shaped according to the particular performance and swim depth desired for the particular lure 10. It should be appreciated that the size and shape of the lip 26 may be configured in various combinations depending on the particular type and performance of the lure 10 desired. Additionally, since the fishing line 25 is not attached to the lip 26, the lip 26 can be constructed of any material that is capable of being molded and/or formed into the desired shape. For instance, in one embodiment, lip 26 can comprise a plastic material. However, in other embodiments, lip 26 can comprise a metallic material or a rubber-like material. Additionally, since the fishing line 25 is not attached to the lip 26, materials that would have been too soft and/or thin for use in a traditional lure lip can be utilized, including but not limited to fiberglass, carbon composite, etc.

The slot 28 defined in the lure lip 26 can have dimensions to couple with the size of the line tie loop 22 of the line tie arm 12. As shown, the slot 28 extends in the longitudinal axis of the lure (i.e., in the direction extending from the tail section 17 to the head section 11) so as to couple with the line tie loop 22 that is oriented in the longitudinal direction. As such, the slot 28 has a length in the longitudinal axis that is greater than the width defined in the lateral axis. However, it is to be understood that in an alternative embodiment, the slot 28 can extend in the lateral axis of the lure (i.e., in the direction perpendicular to the longitudinal axis) such that the slot 28 has a width defined in the lateral axis that is greater than its length in the longitudinal axis. In this embodiment, the line tie loop 22 may be oriented in the lateral direction so as to couple with the slot 28 defined in the lip 26.

In the exemplary embodiment of FIGS. 1-9, trailing edge of the lip 26 is embedded within the head section 11 of lure body 16. In such a configuration, the lip 26 can be adhered, welded, melt-bonded, or otherwise secured to the head section 11 of the lure body 16. However, it is to be understood that the lip 26 can be attached to lure body 16 in any manner desired. For example, referring to the exemplary embodiment shown in FIGS. 10-13, the lip 26 is snap fit onto the lure body 16 via a snap connection 100. As shown in this embodiment, the lip 26 defines a connection slot 101 between a pair of connection arms 102. A pair of flanges 104 are positioned on the pair of connection arms 102 and are oriented inwardly (i.e., toward each other). In the exemplary embodiment shown, the flanges 104 are configured to fit within a pair of cavities 106 defined in the head section 11 of the lure body 16. As best shown in the clos-up view of FIG. 11, the cavities 106 may be defined within a connection area 105 of the head section 11 that is configured to receive the connection arms 102. Once inserted, the interaction of the flanges 104 of the lip 26 with the cavities 106 of the lure body 16 can effectively secure the lip 26 onto the head section 11 of the lure body 16.

As stated, the lip 26 generally defines a slot 28 configured to receive the line tie loop 22 of the line tie arm 12 therethrough. When extending through the slot 28, as shown in FIG. 1, the line tie arm 12 can be described as in a fishing position. Thus, the fishing line 25 can be attached, directly or indirectly (e.g., via the optional split ring 24), to the line tie loop 22 without applying undue pressure or other forces onto the lip 26. For instance, during casting, retrieving the lure, and fighting a fish, the pressure applied from the fishing line 25 onto the lure 10 is passed to the lure body 16 via the line tie arm 12 and the pin 14, and not via the lip 26.

In the exemplary embodiments shown, the line tie arm 12 can swing around the axis of the pin 14, but is generally limited by the lip 26 in a first direction (i.e., up as shown in FIG. 7). When present, the split ring 24 attached to the line tie loop 22 limits the rotation of the arm 12 in a second direction (i.e., down as shown in FIG. 7). Alternatively, if the fishing line 25 is attached directly to the line tie loop 22, the attachment mechanism (e.g., a knot, crimp, etc.) can inhibit rotation of the arm 12 in the second direction. Thus, in one embodiment, the lateral travel of the line tie arm 12 in normal use is structurally limited.

The line tie arm 12 can be constructed of any suitable material configured to provide sufficient strength for attachment of a fishing line to the lure 10. For example, the line tie arm 12 can be constructed from a metal, metal composite, hard plastic, etc. In one particular embodiment, the line tie arm 12 can be constructed from stainless steel.

Likewise, the pin 14 can be constructed of any suitable material configured to provide sufficient strength for attachment of a fishing line to the lure 10. For example, the pin 14 can be constructed from a metal, metal composite, hard plastic, etc. In one particular embodiment, the pin 14 can be constructed from stainless steel. As such, the pin 14 can be substantially rigid and can be held in place within the lure 10 via the lure body 16.

The lure body 16 is shown to be generally shaped to resemble a bait fish in the embodiments shown in FIGS. 1-9 and 10-13. However, the lure body 16 can be designed to resemble bait fish or other aquatic species that are typical food sources for the targeted fish. In fact, lure body 16 can be shaped to resemble many different types of bait fish while still remaining within the scope of the present disclosure.

In an effort to make the lure aesthetically realistic, the lure body 16 can be colored any desired color or combination of colors. For example, colored plastics or rubber may be used to form the lure body 16. In addition, the lure body 16 can be painted or stained on its external surface to achieve the desired color and marking characteristics. For example, the lure body 16 can include various ornamental designs, such as eyes, fins, scales, coloring, and other decorative features, that may be painted onto the surface or otherwise added to the lure body 16.

Generally, the lure body 16 can be made of any material suitable for being shaped into a lure body. In one particular embodiment, the lure body 16 is molded into a hard body (e.g., molded plastic or metal). Alternatively, the lure body 16 can be molded from malleable plastic material (e.g., thermoplastics, thermosetting plastics, etc.) as is commonly known in the art. However, soft plastics can be utilized to form the lure body 16.

The fishing lure 10 is also shown having two hook attachment rings 30 attached to the lure body 16. Any suitable hook (e.g., a mono hook, double hook, or treble hook), or plurality of hooks, can be attached to the lure body 16 via the hook attachment rings 30. Alternatively, the hook(s) can be attached to the lure body 16 according to any mechanism, and can be positioned in other areas and by other methods on lure 10. FIG. 1 is only an example of the number and positioning of rings 30 and hooks (not shown). One or any number of various types of rings 30 hooks may be positioned on lure body 16 as desired.

In another embodiment, the lure 10 can be a "teaser lure" having no hooks, which is designed to attract fish to the teaser to allow the angler to catch the fish with another lure or net. Such teaser lures are often utilized with a "bait and switch" fishing technique, sometimes using the teaser to attract the fish and a fly rod setup to catch the fish.

The tail portion 17 of the lure body 16 is substantially shaped to come to a point in the shown embodiment. However, in other embodiments, the tail portion 17 of the lure body 16 can be shaped to define a fin that adds more life-like movement to lure 10 while being fished, if desired. In fact, the tail portion 17 can be shaped to form any shape desired.

Other features can be included on or within the lure as desired. For example, a weight (not shown) can be included to help control the depth of the lure 10 while be fished. Additionally, a ball/tube combination configured to produce an audible sound may be included within the lure body 16, such as described in U.S. Publication No. 2010/0000145 A1 of Lappala, which is incorporated by reference herein. In another embodiment, a protective member can be positioned onto the lip 26, such as described in U.S. Publication No. 2006/0254119 of Siirtola, et al., which is incorporated by reference herein.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole or in part. Furthermore, those of ordinary skill in the art will appreciate that the foregoing description is by way of example only, and is not intended to limit the invention so further described in the appended claims.

What is claimed:
1. A fishing lure comprising:
a lure body comprising a pin;
a diving lip extending from the lure body, wherein the diving lip defines a slot therein extending from a bottom surface of the diving lip to a top surface of the diving lip; and
a line tie arm comprising a beam, a line tie loop, and a pivot ring, wherein the line tie loop is connected to a first end of the beam and the pivot ring is connected to a second end of the beam, wherein the pivot ring is rotatably attached to the pin, and wherein the line tie arm is positioned such that the beam is adjacent to the bottom surface of the diving lip and the line tie loop extends through the slot defined in the diving lip when the line tie arm is in a fishing position.

2. The fishing lure of claim 1, further comprising:
an attachment ring attached to the line tie loop such that the attachment ring and slot cooperate to hold the line tie arm in the fishing position.

3. The fishing lure of claim 2, wherein the attachment ring is a split ring.

4. The fishing lure of claim 1, wherein the line tie loop is oriented in a longitudinal direction defined by the lure body, and wherein the slot defined in the lip is oriented in the longitudinal direction.

5. The fishing lure of claim 1, wherein the line tie arm comprises stainless steel.

6. The fishing lure of claim 1, wherein the pin comprises stainless steel.

7. The fishing lure of claim 1, wherein the lure body comprises a molded plastic material.

8. The fishing lure of claim 1, wherein the lip comprises a molded plastic material, a metal material or alloy, fiberglass, or a carbon composite.

9. The fishing lure of claim 1, wherein the diving lip is attached to the lure body via a snap connection.

10. The fishing lure of claim 1, wherein the lure body is shaped to resemble a bait fish.

11. The fishing lure of claim 10, wherein the diving lip extends from a head portion of the lure body.

12. The fishing lure of claim 10, wherein a hook attachment ring is attached to the lure body.

13. The fishing lure of claim 12, further comprising:
a hook attached to the hook attachment ring.

* * * * *